(12) United States Patent
Rebecq et al.

(10) Patent No.: US 11,151,739 B2
(45) Date of Patent: Oct. 19, 2021

(54) SIMULTANEOUS LOCALIZATION AND MAPPING WITH AN EVENT CAMERA

(71) Applicant: UNIVERSITAT ZURICH, Zurich (CH)

(72) Inventors: Henri Rebecq, Zurich (CH); Guillermo Gallego Bonet, Zurich (CH); Davide Scaramuzza, Zurich (CH)

( * ) Notice: Subject to any disclaimer, the term of this patent is extended or adjusted under 35 U.S.C. 154(b) by 0 days.

(21) Appl. No.: 16/327,871

(22) PCT Filed: Aug. 24, 2017

(86) PCT No.: PCT/EP2017/071331
§ 371 (c)(1),
(2) Date: Feb. 25, 2019

(87) PCT Pub. No.: WO2018/037079
PCT Pub. Date: Mar. 1, 2018

(65) Prior Publication Data
US 2019/0197715 A1     Jun. 27, 2019

(30) Foreign Application Priority Data

Aug. 24, 2016  (EP) .................................... 16185476

(51) Int. Cl.
*G06T 15/06*     (2011.01)
*G06T 7/579*     (2017.01)
(Continued)

(52) U.S. Cl.
CPC ............... *G06T 7/579* (2017.01); *G06T 7/74* (2017.01); *G06T 15/06* (2013.01); *G06T 15/08* (2013.01);
(Continued)

(58) Field of Classification Search
CPC . G06T 2207/20221; G06T 2207/10028; G06T 2207/30244; G06T 15/06;
(Continued)

(56) References Cited

U.S. PATENT DOCUMENTS 7,450,132 B2 * 11/2008 Park ........................ G06T 15/04
345/582
7,486,325 B2 * 2/2009 Kondo ................... G03B 35/00
348/335
(Continued)

OTHER PUBLICATIONS

Mueggler Elias Et Al: "Towards evasive maneuvers with quadrotors using dynamic vision sensors", 2015 European Conference on Mobile Robots (ECMR), IEEE, Sep. 2, 2015, pp. 1-8.
(Continued)

*Primary Examiner* — Nasser M Goodarzi
*Assistant Examiner* — Patrick A Ryan
(74) *Attorney, Agent, or Firm* — JMB Davis Ben-David

(57) ABSTRACT

The invention relates to a method for 3D reconstruction of a scene, wherein an event camera (1) is moved on a trajectory (T) along the scene, wherein the event camera (1) comprises a plurality of pixels that are configured to only output events ($e_k$) in presence of brightness changes in the scene at the time ($t_k$) they occur, wherein each event comprises the time ($t_k$) at which it occurred, an address ($x_k, y_k$) of the respective pixel that detected the brightness change, as well as a polarity value ($p_k$) indicating the sign of the brightness change, wherein a plurality of successive events generated by the event camera (1) along said trajectory (T) are back-projected according to the viewpoint (P) of the event camera (1) as viewing rays (R) through a discretized volume (DSI) at a reference viewpoint (RV) of a virtual event camera associated to said plurality of events, wherein said discretized volume (DSI) comprises voxels (V'), and wherein a score function $f(X)$ associated to the discretized
(Continued)

volume (DSI) is determined, which score function $f(X)$ is the number of back-projected viewing rays (R) that pass through the respective voxel (V') with center X, and wherein said score function $f(X)$ is used to determine whether or not a 3D point of the 3D reconstruction of the scene is present in the respective voxel (V').

13 Claims, 10 Drawing Sheets

(51) Int. Cl.
| | |
|---|---|
| *G06T 7/73* | (2017.01) |
| *H04N 13/271* | (2018.01) |
| *H04N 13/111* | (2018.01) |
| *H04N 13/282* | (2018.01) |
| *G06T 15/08* | (2011.01) |
| *G06T 15/20* | (2011.01) |

(52) U.S. Cl.
CPC ............ *G06T 15/20* (2013.01); *H04N 13/111* (2018.05); *H04N 13/271* (2018.05); *H04N 13/282* (2018.05); *G06T 2200/04* (2013.01); *G06T 2207/10028* (2013.01); *G06T 2207/20012* (2013.01); *G06T 2207/20221* (2013.01); *G06T 2207/30244* (2013.01)

(58) Field of Classification Search
CPC  G06T 15/20; G06T 15/08; G06T 7/74; G06T 7/579; H04N 13/282; H04N 13/111
See application file for complete search history.

(56) References Cited

U.S. PATENT DOCUMENTS

| | | | | |
|---|---|---|---|---|
| 8,160,327 | B2* | 4/2012 | Denis | G06T 15/08 |
| | | | | 382/128 |
| 8,340,349 | B2* | 12/2012 | Salgian | G06K 9/209 |
| | | | | 348/142 |
| 9,576,183 | B2* | 2/2017 | Reitmayr | G06K 9/00201 |
| 2007/0206008 | A1* | 9/2007 | Kaufman | G06T 15/40 |
| | | | | 345/424 |
| 2009/0213240 | A1* | 8/2009 | Sim | G06T 17/00 |
| | | | | 348/222.1 |
| 2013/0004060 | A1* | 1/2013 | Bell | H04N 13/257 |
| | | | | 382/154 |
| 2013/0342671 | A1* | 12/2013 | Hummel | G06F 3/011 |
| | | | | 348/77 |
| 2014/0285486 | A1* | 9/2014 | Chang | G06T 17/00 |
| | | | | 345/420 |
| 2015/0125034 | A1* | 5/2015 | Tateno | G06T 7/75 |
| | | | | 382/103 |

OTHER PUBLICATIONS

Paul Register Et Al: "Asynchronous Event-Based Binocular Stereo Matching", IEEE Transactions on Neural Networks and Learning Systems, IEEE, Piscataway, NJ, USA, vol. 23, No. 2, Feb. 1, 2012, pp. 347-353.

Censi Andrea Et Al: "Low-latency localization by active LED markers tracking using a dynamic vision sensor", 2013 IEEE/RSJ International Conference on Intelligent Robots and Systems, IEEE, Nov. 3, 2013 pp. 891-898.

Brandli et al., "A 240X180 130 dB 3 us Latency Global Shutter Spatiotemporal Vision Sensor", IEEE oumal of Solid-State Circuits, vol. 49, No. 10, Oct. 2014, pp. 2333-2341.

Camunas-Mesa et al., "On the use of orientation filters for 3D reconstruction in event-driven stereo vision", Frontiers in Neuroscience, vol. 8, Article 48, Mar. 2014.

Collins, "A Space-Sweep Approach to True Multi-Image Matching", Univ. of Mass., http://vis{www.cs.umass.edu/rcollins/home.html.

Foster et al.,"SVO: Fast Semi-Direct Monocular Visual Odometry", 2014 IEEE International Convention on Robotics and Automation (ICRA), May-Jun. 2014, Hong Kong, 978-1-4799-3685-4/14/$31.00.

Kogler et al., "Event-Based Stereo Matching Approaches for Frameless Address Event Stereo Data", G. Bebis et al. (Eds.): ISVC 2011, Part I, LNCS 6938, pp. 674-685, 2011.

Kogler et al., "Address-Event Based Stereo Vision With Bio-Inspired Silicon Retina Imagers", Advances in Theory and Applications of Stereo Vision, pp. 165-188, ISBN 978-953-307-516-7, 2011.

Lee et al., "Lve Demonstration: Gesture-Based Remote Control Using Stereo Pair of Dynamic Vision Sensors", IEEE, 97B-4673-0219-7/12/$31.00, 2102.

Rogister et al., "Asynchronous Event-Based Binocular Stereo Matching", IEEE Transactions on Neural Networks and Learning Systems, vol. 23, No. 2, Feb. 2012, 2162-237X/$26.00.

Schraml et al., "Dynamic Stereo Vision System for Real-Time Tracking", IEEE, 2010.

Seitz et al., "A Comparison and Evaluation of Mult-View Stereo Reconstruction Algorithms", Proceedings of the 2006 IEEE Computer Society Conference on Computer Vision and Pattern Recognition (CVPR'06), 0-7695-2597-0/06$20.00, 2006.

Szeliski, "Computer Vision: Algorithms and Applications", Springer, 2010.

Szeliski et al., "Stereo Matching with Transparency and Matting", Kluwer Academic Publishers, International Journal of Computer Vision 32(1), 45-61 (1999).

* cited by examiner

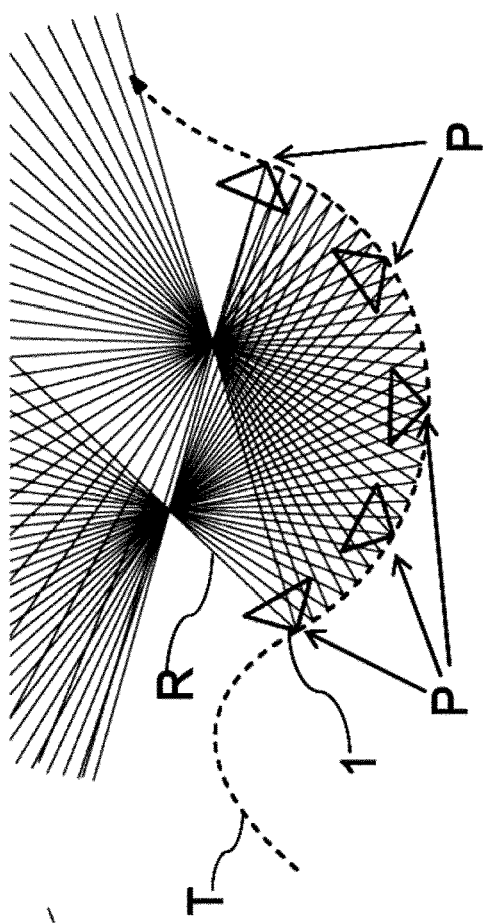
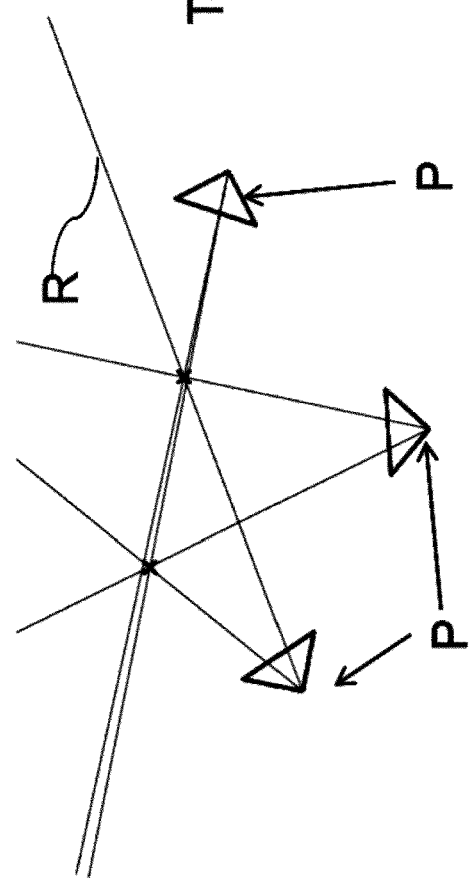
Fig. 1(a)
Fig. 1(b)

(a) Image at virtual camera.
(b) DSI slice at *close* depth.
(c) DSI slice at *middle* depth.
(d) DSI slice at *far* depth.

(a) Ray density DSI $f(\mathbf{X})$.

(b) Confidence map.

(c) Semi-dense depth map.

(d) 3D point cloud.

(a) Frame (motion blur). (b) Events ($\Delta t = 2ms$). (c) Frame and events.

(a) Side view. (b) Front view. (c) Projection on a frame.

(a) Side view.
(b) Top view.
(c) Projection on a frame.

(a) 3D scene and poses involved in the registration process.

(b) Projected semi-dense map $M$      (c) Event image $I$

SIMULTANEOUS LOCALIZATION AND MAPPING WITH AN EVENT CAMERA

CROSS-REFERENCE TO RELATED APPLICATIONS

This is the U.S. National Stage of International Patent Application No. PCT/EP2017/071331 filed Aug. 24, 2017, which was published in English under PCT Article 21(2), and which in turn claims the benefit of European Patent Application No. 16185476.5 filed Aug. 24, 2016.

The present invention relates to a method, particularly an algorithm, for 3D reconstruction of a scene, as well as to a computer program and a device for conducting such a method/algorithm. Furthermore, the invention relates to a method for localizing an event camera with respect to an existing semi-dense 3D map by registering an event image obtained by the event camera to a template image.

The goal of traditional multi-view stereo algorithms/methods is to reconstruct a complete three-dimensional (3D) object model from a collection of images taken from known camera viewpoints.

In this regard, the problem underlying the present invention is to provide a method that allows to conduct a 3D reconstruction of a scene in a simple and efficient manner.

This problem is solved by a method having the features of claim 1. Further aspects of the present invention relate to a corresponding computer program, and a corresponding device.

Preferred embodiments of the method according to the invention are stated in the corresponding sub-claims and are described below.

According to claim 1, a method for 3D reconstruction of a scene is disclosed, wherein an event camera is moved on a trajectory along a scene that is to be reconstructed in three dimensions (3D), wherein the event camera comprises a plurality of independent pixels that are configured to only output events ($e_k$) in presence of brightness changes in the scene at the time ($t_k$) they occur, wherein each event comprises the time ($t_k$) at which it occurred, an address (e.g. coordinates) ($x_k, y_k$) of the respective pixel that detected the brightness change, as well as a polarity value ($p_k$) indicating the sign of the brightness change, wherein a plurality of successive events generated by the event camera along said trajectory are back-projected according to the viewpoint of the event camera as viewing rays through a discretized volume (also denoted as Disparity Space Image or DSI) positioned at a reference viewpoint of a virtual event camera, which reference viewpoint is chosen among those event camera viewpoints associated to said plurality of events, wherein said discretized volume comprises voxels, and wherein a score function $f(X): V \to \mathbb{R}^+$ associated to the discretized volume is determined, which score function $f(X)$ is the number of back-projected viewing rays that pass through the respective voxel with center X, and wherein said score function $f(X)$ (which is also denoted as ray density function) is used to determine whether or not a 3D point of the 3D reconstruction of the scene is present in the respective voxel.

Unlike traditional MVS methods, which address the problem of estimating dense 3D structure from a set of known viewpoints, the method according to the present invention, which is also denoted as EMVS for Event-based Multi View Stereo, estimates semi-dense 3D structure from an event camera, particularly from only a single event camera, with known trajectory.

Particularly, the method according to the present invention elegantly exploits two inherent properties of an event camera:

(i) its ability to respond to scene edges, which naturally provide semi-dense geometric information without any pre-processing operation, and (ii) the fact that it provides continuous measurements as the camera moves.

Despite its simplicity (it can be implemented in a few lines of code), the method/algorithm according to the invention is able to produce accurate, semi-dense depth maps. Particularly, the method according to the invention is computationally very efficient and runs in real-time on a CPU.

In the framework of the present invention, an event camera is a sensor which comprises a plurality of independent light sensitive pixels that are configured to only send information, called "events", in presence of brightness changes in the scene at the time they occur. Particularly each event comprises the time at which it occurred, an address (e.g. coordinates) of the respective pixel that detected the brightness change, as well as a polarity value indicating the sign of the brightness change.

Particularly, each pixel of the event camera outputs an event merely when the respective signal due to the light impinging on the respective pixel increases by an amount being larger than a first threshold ($\Theta_{ON}$) or decreases by an amount being larger than a second threshold ($\Theta_{OFF}$) since the last event from the respective pixel, wherein each event carries the above-stated information, i.e. the address of the pixel, the time of at which the event occurred, the polarity value indicating whether the respective temporal contrast event is an ON event (e.g. polarity value of +const (e.g. +1)) at which said signal increased by an amount larger than said first threshold ($\Theta_{ON}$), or an OFF event (e.g. polarity value of −const (e.g. −1)) at which said signal decreased by an amount larger than said second threshold ($\Theta_{OFF}$).

Thus, particularly, the output of such an event camera is not an intensity image but a stream of asynchronous events at microsecond resolution, where each event consists of its space-time coordinates and the sign of the brightness change (i.e. no intensity). Since events are caused by brightness changes over time, an event camera naturally responds to edges in the scene in presence of relative motion.

Event cameras have numerous advantages over standard cameras: a latency in the order of microseconds, a low power consumption, and a high dynamic range (130 dB vs 60 dB). An example of such an event camera is the DAVIS [1].

These properties make the sensors ideal in all those applications where fast response and high efficiency are crucial and also in scenes with wide variations of illumination. Additionally, since information is only sent in presence of brightness changes, the event camera removes all the inherent redundancy of standard cameras, thus requiring a very low data rate (kilobytes vs. megabytes).

So far, the state of the art has not addressed depth estimation from a single event camera. All related works tackle an entirely different problem, namely 3D reconstruction of a scene with two or more event cameras that are rigidly attached (i.e., with a fixed baseline) and share a common clock. These methods follow a two-step approach: first they solve the event correspondence problem across image planes and then triangulate the location of the 3D point. Events are matched in two ways: either using traditional stereo methods on artificial frames generated by accumulating events over time [6, 9], or exploiting simultaneity and temporal correlations of the events across sensors [2, 5, 7, 8].

However, particularly, the event-based method according to the present invention significantly departs from state of the art in two ways: (i) a single camera is considered, (ii) simultaneous event observations are not required.

Depth estimation from a single event camera is more challenging because one cannot exploit temporal correlation between events across multiple image planes.

Notwithstanding, the present invention proves that a single event camera suffices to estimate depth, and, moreover, is able to estimate depth without solving the data association problem, as opposed to previous event-based stereo-reconstruction methods.

According to a preferred embodiment of the present invention, said discretized volume (DSI) has a size $w \times h \times N_z$, wherein w and h are the number of pixels of the event camera in x and y direction (i.e. the size of the sensor), and wherein $N_z$ is a number of depth planes $\{Z_i\}_{i=1}^{N_z}$, and wherein particularly the discretized volume (DSI) is adapted to the field of view and perspective projection of the virtual event camera at said reference viewpoint.

Further, according to a preferred embodiment of the present invention, it is determined/detected that a 3D point of the scene is present in a voxel of the discretized volume associated to said reference viewpoint when said score function $f(X)$ assumes a local maximum for this voxel. In other words, said 3D points are detected by determining the local maxima of the score function of the discretized volume (DSI).

Further, according to an embodiment of the present invention, the local maxima of the score function $f(X)$ are detected following a two-step procedure. First, a dense depth map $Z^*(x,y)$ and an associated confidence map $c(x,y)$ are generated at said reference viewpoint, wherein $Z^*(x,y)$ stores the location of the maximum score along the row of voxels corresponding to pixel (x,y), and $c(x,y)$ stores the value of said maximum, $c(x,y):=f(X(x), Y(y), Z^*(x,y))$. Second, a semi-dense depth map is created from $Z^*$ by selecting the subset of pixels (with depth) using said confidence map $c(x,y)$. Adaptive thresholding on said confidence map $c(x,y)$ yields a binary confidence mask that selects a subset of pixel locations in the map $Z^*$, yielding a semi-dense depth map. Specifically, a pixel (x,y) is selected if $c(x,y) > T(x,y)$, with $T(x,y) = c(x,y) * G(x,y) - C$ where * denotes the two-dimensional (2D) convolution, G is a Gaussian kernel, and C a constant offset.

Particularly, motivated by a scalable design, the method is performed on multiple subsets of the event stream, thus recovering semi-dense depth maps of the scene at multiple reference viewpoints.

Therefore, according to an embodiment of the present invention, said plurality of successive events generated by the event camera along said trajectory forms a subset of events of a stream of events generated by the event camera along said trajectory, wherein said stream is divided into a plurality of subsequent subsets of events, wherein each subset contains a plurality of successive events generated by the event camera, wherein the successive events of each subset are back-projected according to the viewpoint of the event camera as viewing rays through a discretized volume (DSI) positioned at a reference viewpoint of a virtual event camera associated to the respective subset (particularly, this reference viewpoint is chosen among those event camera viewpoints of the respective subset), wherein said discretized volume comprises voxels, and wherein a score function $f(X): V \to \mathbb{R}^+$ associated to the respective discretized volume is determined, which score function $f(X)$ is the number of back-projected viewing rays of the respective subset that pass through the respective voxel (V') with center X of the respective discretized volume, and wherein the respective score function $f(X)$ is used to determine whether or not a 3D point of the 3D reconstruction of the scene is present in the respective voxel of the respective discretized volume associated to the respective subset.

Particularly, a new reference viewpoint is selected when a distance to the previous reference viewpoint exceeds a certain percentage of the mean scene depth, wherein now the plurality of events generated by the event camera until a next reference view point (this plurality of events again forms a subset of said stream) is used to estimate a further corresponding semi-dense depth map containing 3D points of the 3D reconstruction of the scene.

Again, the local maxima of the respective score function $f(X)$ are detected using a dense depth map $Z^*(x,y)$ in the virtual event camera for each reference viewpoint and by generating an associated confidence map $c(x,y):=f(X(x), Y(y), Z^*)$ for each reference viewpoint as described above.

Furthermore, according to an embodiment, the semi-dense depth maps are preferably smoothed using a median filter acting on the selected confident pixel locations and then converted to point clouds, wherein the respective point cloud is particularly cleaned from those isolated points whose number of neighbors within a given radius is less than a threshold, and wherein said point clouds are merged into a global point cloud using the known positions of the virtual event cameras at the respective reference viewpoint, wherein said global point cloud comprises the 3D points of the 3D reconstruction of the scene.

Further, according to an embodiment of the present invention, the event camera is moved manually along said trajectory.

Further, according to an embodiment of the present invention, the event camera is moved along said trajectory by means of a movement generating means.

Particularly, said movement generating means is formed by one of: a motor, a motor vehicle, a train, an aircraft, a robot, a robotic arm, a bicycle.

A particular application of the method according to the invention is any 3D scanning procedure that particularly needs to run at relatively high speed where standard cameras would fail. For instance, current train infrastructure inspections are performed with lidars or standard cameras installed on special inspection trains that run much lower speeds compared with standard trains running at more than 100 km/h. The method according to the present invention allows to mount an event camera on a regular train looking at the track or at the side and to perform inspection of track and tunnels or other nearby train infrastructure on all normal trains. Other possible applications are inspection with fast robotic arms.

Particularly, according to an embodiment of the method according to the present invention, the event camera is moved along said trajectory with a velocity in the range from 0 km/h to 500 km/h, particularly 1 km/h to 500 km/h, particularly 100 km/h to 500 km/h, particularly 150 km/h to 500 km/h, particularly 200 km/h to 500 km/h, particularly 250 km/h to 500 km/h, particularly 300 km/h to 500 km/h, particularly 350 km/h to 500 km/h, particularly 400 km/h to 500 km/h.

According to another aspect of the present invention, a computer program for 3D reconstruction of a scene is disclosed, wherein the computer program comprises program code for conducting the following steps when the computer program is executed on a computer:

back-projecting a plurality of events generated by means of an event camera according to the viewpoint of the event camera as viewing rays through a discretized volume (DSI) positioned at a reference viewpoint of a virtual event camera that is chosen among those event camera viewpoints associated to said plurality of events, wherein said discretized volume comprises voxels, and determining a score function $f(X):V \to \mathbb{R}^+$ associated to the discretized volume, which score function $f(X)$ is the number of back-projected viewing rays that pass through the respective voxel with center X, and using said score function $f(X)$ to determine whether or not a 3D point of the 3D reconstruction of the scene is present in the respective voxel.

Furthermore, the program code is preferably adapted to conduct the method steps described in one of the claims 2 to 11 when the computer program is executed on a computer.

Further, according to yet another aspect of the present invention, a device is disclosed that comprises an event camera and an analyzing means, wherein said event camera and said analyzing means are configured to conduct the method according to one of the claims 1 to 11 when the event camera is moved on a trajectory along a scene.

Particularly, said device can be a hand-held device such as a mobile phone (particularly smart phone).

Furthermore, yet another aspect of the present invention relates to a method for localizing an event camera with respect to an existing semi-dense 3D map by registering an event image obtained by the event camera to a template image, wherein the event image is obtained by aggregating a plurality of events obtained with the event camera into an edge map, and wherein the template image consists of a projected semi-dense 3D map of a scene according to a known pose of the event camera, wherein a 6 degrees of freedom relative pose of the event camera is estimated by means of registering the event image to the template image.

In the following, further advantages and features of the present invention as well as embodiments and examples of the present invention are described with reference to the Figures, wherein:

FIG. 1 shows a comparison of the back-projection step in classical Space-Sweep and Event-Based Space-Sweep. Here a 2D illustration is used with a scene consisting of two points. FIG. 1(*a*) shows the classical (frame-based) Space-Sweep, wherein only a fixed number of views is available. Two points of an edge map are visible in each image. The intersections of rays obtained by back-projecting the image points are used as evidence for detection of scene features (object points). Further FIG. 1(*b*) shows an Event-Based Space-Sweep, wherein here, as the event camera moves, events are triggered on the event camera. To each observed event corresponds a ray (trough back-projection), that spans the possible 3D-structure locations. The areas of high ray density correspond to the locations of the two points, and are progressively discovered as the event camera moves;

FIG. 2 shows a DSI ray counter that is centered at a virtual camera in a reference viewpoint (RV), wherein its shape is adapted to the perspective projection of the camera. Every incoming viewing ray from a back-projected event (arrows) votes for all the DSI voxels (light grey) which it traverses;

FIG. 3 shows the event camera moved above three textured planes located at different depths (close, middle, far). The ray density DSI $f(X)$ has been built as described herein, wherein the effect of slicing it at different depths is shown, so as to simulate a plane sweeping through the DSI. When the sweeping plane coincides with an object plane, the latter appears very sharp while the rest of the scene is "out of focus";

FIG. 4 shows single steps of an EMVS method according to the invention, wherein a ray density DSI $f(X)$ is built (a), from which a confidence map (b) and a semi-dense depth map (c) are extracted in a virtual camera. The semi-dense depth map gives a point cloud of scene edges (d) (same dataset as in FIG. 3);

FIG. 5 shows synthetic experiments: estimated semi-dense depth maps overlayed over screen shots of the scene, in three datasets (a)-(c). Depth is grey scale coded, from close (dark) to far (light). The EMVS method according to the invention successfully recovers most edges, even without regularization or outlier filtering. (d): Relative error as a number of depth planes $N_z$, in all three datasets.

FIG. 6 HDR experiment: Top: Scene and illumination setups, with the DAVIS (event camera) on the motorized linear slider (a) and a lamp (b). Sample frames show under- and over-exposed levels in HDR illumination (b). By contrast, the events (overlayed on the frames) are unaffected, due to the high dynamic range of the event sensor. Bottom: reconstructed point clouds;

Figure 9:
Figure 10:
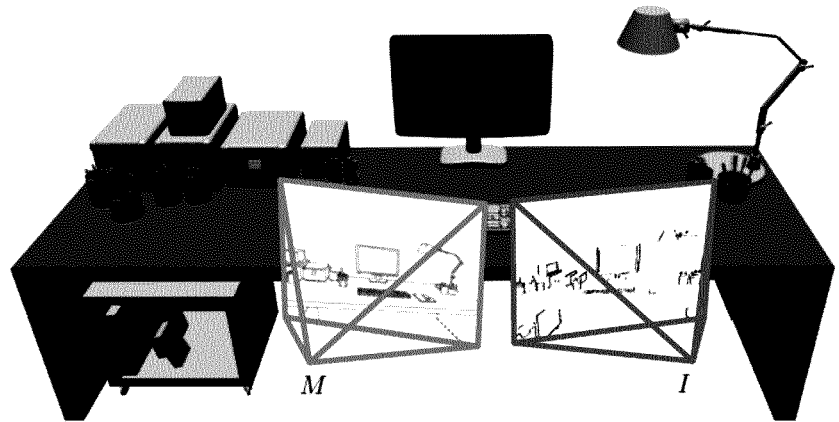
Figure 10:
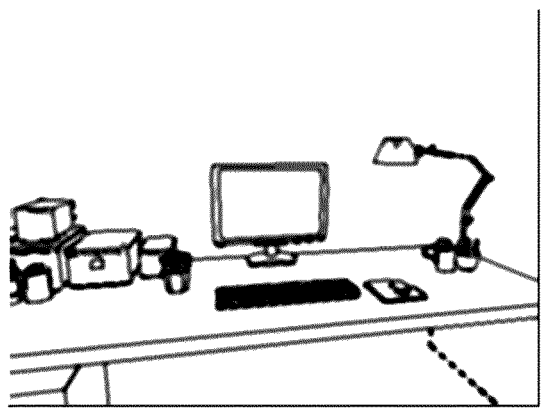
Figure 10:

FIG. 9 shows the boxes dataset: large-scale semi-dense 3D reconstruction with a hand-held DAVIS (event camera); and FIG. 10 shows (a) a 3D scene and poses involved in the registration process; (b) a projected semi-dense map M (c), and (c) an event image I, wherein pose tracking computes the pose of the event camera with respect to a reference pose by aligning the event image I with the projected semi-dense map M. Edges parallel to the camera motion are not captured by the event sensor/camera.

Multi View Stereo (MVS) with traditional cameras addresses the problem of 3D structure estimation from a collection of images taken from known viewpoints [11]. The Event-based MVS (EMVS) according to the invention shares the same goal; however, there are some key differences:

Traditional MVS algorithms work on full images, so they cannot be applied to the stream of asynchronous events provided by an event camera sensor. EMVS must take into account the sparse and asynchronous nature of the events.

Because event cameras do not output data if both the event camera and the scene are static, EMVS requires the event camera to be moved in order to acquire visual content. In traditional MVS, the camera does not need to be in motion to acquire visual content.

Because events are caused by intensity edges, the natural output of EMVS is a semi-dense 3D map, as opposed to the dense maps of traditional MVS.

Hence, the EMVS problem consists of obtaining the 3D reconstruction of a scene from the sparse asynchronous streams of events acquired by a moving event camera with known viewpoints. Without loss of generality, it suffices to consider the case of one event camera.

To solve the EMVS problem, classical MVS approaches cannot be directly applied since they work on intensity images. Nevertheless, the event-based approach according to the invention builds upon previous works on traditional MVS [10]. In particular, by using (cf. below) the solving strategy of Scene Space MVS methods [10], which consist of two main steps: computing an aggregated consistency score in a discretized volume of interest (the so called Disparity Space Image (DSI)) by warping image measurements, and then finding 3D structure information in this volume. Particularly, the term DSI is used to denote both the discretized volume of interest and the score function defined on it. The DSI is defined by a pixel grid and a number $N_z$ of depth planes $\{Z_i\}_{i=1}^{N_z}$, that is, it has a size w×h×$N_z$, wherein w and h are the number of pixels of the event camera in x and y direction. The depths $Z_i$ can be chosen freely. Two example choices are: sampling depth linearly between a minimum and maximum depth, and sampling inverse depth linearly between a minimum and maximum depth. The score stored in the DSI, $f(X):V \rightarrow \mathbb{R}^+$, is the number of back-projected viewing rays R passing through each voxel V' with center $X=(X,Y,Z)^T$. Just by considering the way that visual information is provided, one can point out two key differences between the DSI approaches in MVS and EMVS:

In classical MVS, the DSI is densely populated using pixel intensities. In EMVS, the DSI may have holes (voxels with no score value), since warped events are also sparse.

In classical MVS, scene objects are obtained by finding an optimal surface in the DSI. By contrast, in EMVS, finding semi-dense structures (e.g., points, curves) is a better match to the sparsity of the DSI.

Particularly, the present invention addresses the problem of structure estimation with a single event camera by introducing the concept of Event-based Multi-View Stereo (EMVS), particularly by means of using a Space-Sweep [3] voting and maximization strategy to estimate semi-dense depth maps at selected viewpoints, and then by merging the depth maps to build larger 3D models. The method according to the invention is evaluated on both synthetic and real data. The results are analyzed and compared with ground truth, showing the successful performance of the approach according to the invention.

Particularly, the present invention generalizes the Space-Sweep approach for the case of a moving event camera by building a virtual camera's DSI [12] containing only geometric information of edges and finding 3D points in it.

In contrast to most classical MVS methods, which rely on pixel intensity values, the Space-Sweep method [3] relies solely on binary edge images (e.g. Canny) of the scene from different viewpoints. Thus, it leverages the sparsity or semi-density of the view-point dependent edge maps to determine 3D structure. More specifically, the method consists of three steps:

warping (i.e., back-projecting) image features as rays through a DSI, recording the number of rays that pass through each DSI voxel, and, finally, determining whether or not a 3D point is present in each voxel.

The DSI score measures the geometric consistency of edges in a very simple way: each pixel of a warped edge-map onto the DSI votes for the presence or absence of an edge. Then, the DSI score is thresholded to determine the scene points that most likely explain the image edges.

In the following the Space-Sweep algorithm is extended to solve EMVS. It is to be noted that the stream of events provided by event cameras is an ideal input to the Space-Sweep algorithm since (i) event cameras naturally highlight edges in hardware, and (ii) because edges trigger events from many consecutive viewpoints rather than a few sparse ones (cf. FIG. 1).

The three steps of the event-based Space-Sweep method, namely back-projection, ray-counting, and determining the presence of scene structure can be derived as follows:

First of all, the events $e_k=(x_k,y_k,t_k,p_k)$ generated by an event camera 1 are formally defined as a tuple containing the pixel position $(x_k,y_k)$, timestamp $t_k$ and polarity $p_k$ (i.e., sign) of the brightness change. We extend the Space-Sweep method to the event-based paradigm by using the event stream $\{e_k\}$ output by the event camera 1 as the input point-like features that are warped into the DSI. Each event $e_k$ is back-projected according to the viewpoint of the event camera at time $t_k$, which is known according to the assumptions of MVS.

From a geometric point of view, one can compare the back-projection step in the classical frame-based and the event-based settings using FIG. 1. One notes that in frame-based MVS the number of viewpoints P is small compared to that in the highly sampled trajectory of the event camera 1 (at times $\{t_k\}$). This higher abundance of measurements and viewpoints P in the event-based setting (FIG. 1(b)) generates many more viewing rays R than in frame-based MVS, and therefore, it facilitates the detection of scene points by analyzing the regions of high ray-densities.

A major advantage of the method according to the invention is that no explicit data association is needed. This is the main difference between the method according to the invention and existing event-based depth estimation methods.

While previous works essentially attempt to estimate depth by first solving the stereo correspondence problem in the image plane (using frames of accumulated events [6, 9], temporal correlation of events [2, 5, 7, 8], etc.), the method according to the present invention particularly works directly in the 3D space. This is illustrated in FIG. 1(b): there is no need to associate an event to a particular 3D point to be able to recover its 3D location.

In the second step of Space-Sweep, the volume containing the 3D scene is discretized and the number of viewing rays passing through each voxel is counted using a DSI.

To allow for the reconstruction of large scenes in a scalable way, the 3D volume containing the scene is split into smaller 3D volumes along the trajectory of the event camera, local 3D reconstructions are computed, which are then merged, as will be explained in more detail below.

Figure 2:
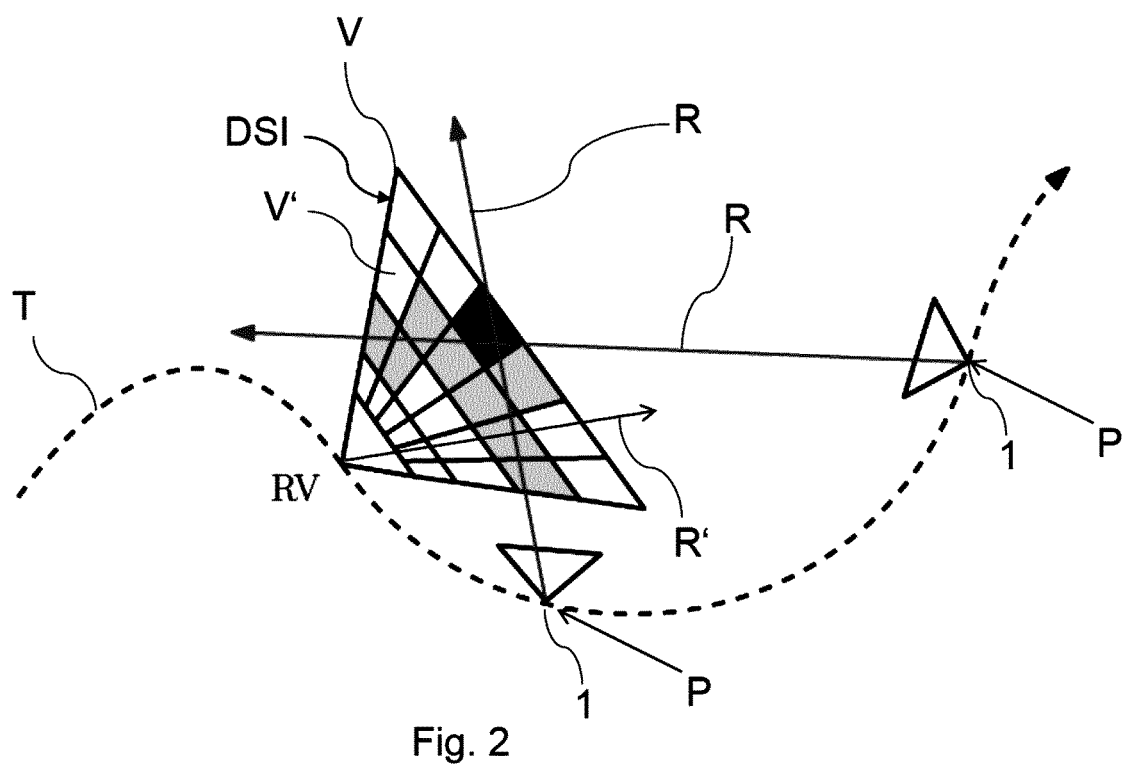

Particularly, for computing a local 3D reconstruction of the scene from a subset of events, a virtual event camera 1 is considered that is located at a reference viewpoint RV that is chosen among those event camera viewpoints P associated to the subset of events, and a DSI in a volume V is defined that comprises voxels V' and is adapted to the field of view and perspective projection of the event camera 1, as illustrated in FIG. 2 (see [12]). The DSI is defined by the event camera pixels and a number $N_z$ of depth planes $\{Z_i\}_{i=1}^{N_z}$, i.e., it has size w×h×$N_z$, where w and h are the width and height of the event camera, i.e. the number of pixels in x and y direction. The score stored in the DSI, $f(X):V \rightarrow \mathbb{R}^+$, is the number of back-projected viewing rays R passing through each voxel V' with center $X=(X,Y,Z)^T$, as shown in FIG. 2.

In the third step of Space-Sweep, we obtain a semi-dense depth map in the virtual event camera by determining whether or not a 3D point is present in each DSI voxel V'. The decision is taken based on the score or ray density function stored in the DSI, namely $f(X)$.

Figure 3:
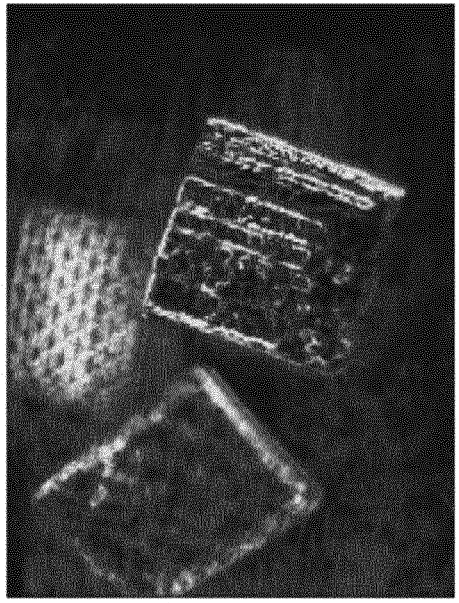
Figure 3:
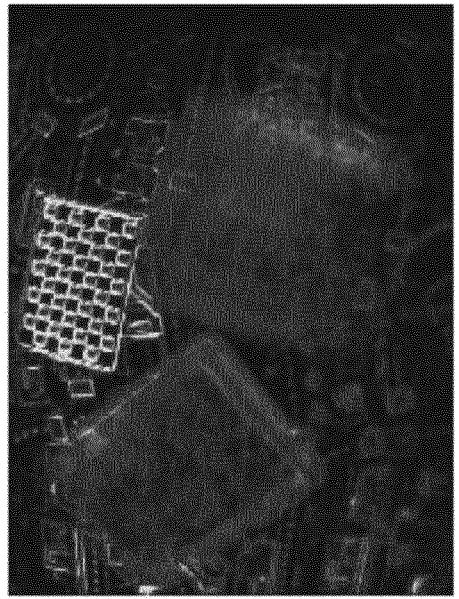
Figure 3:
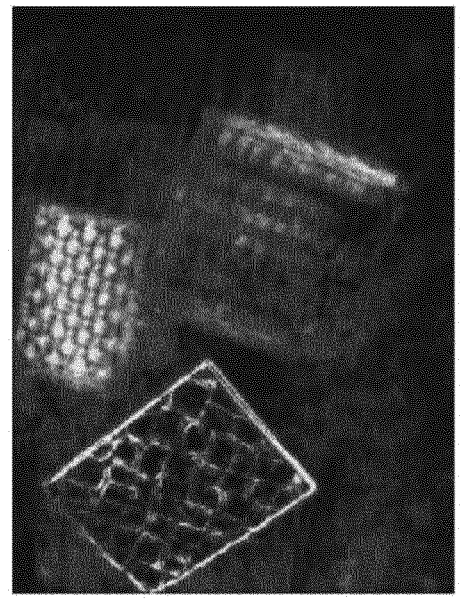

Rephrasing the assumption of the Space-Sweep method [3], scene points are likely to occur at regions where several viewing rays R nearly intersect (see FIG. 1(b)), which correspond to regions of high ray density. Hence, scene points are likely to occur at local maxima of the ray density function. FIG. 3 shows an example of slicing the DSI from a real dataset at different depths; the presence of local maxima of the ray density function is evidenced by the in-focus areas.

Particularly, in the framework of the present invention, the local maxima of the DSI $f(X)$ are detected following a two-step procedure: at first, a (dense) depth map $Z^*(x,y)$ is generated in the virtual event camera and an associated confidence map $c(x,y)$ by recording the location and magnitude of the best local maximum $f(X(x), Y(y), Z^*) =: c(x,y)$ along the row of voxels V' in the viewing ray R of each pixel (x,y).

Figure 4:
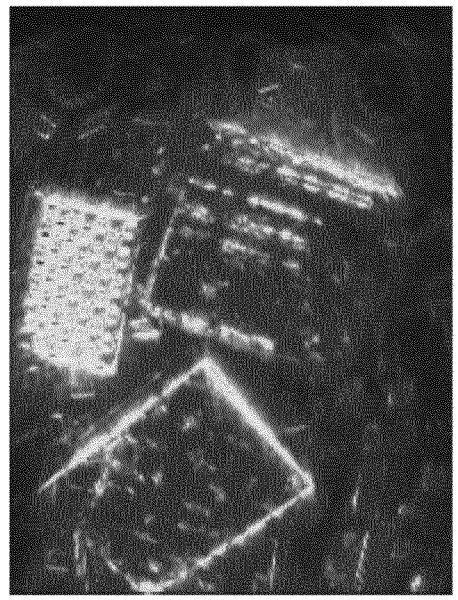
Figure 4:
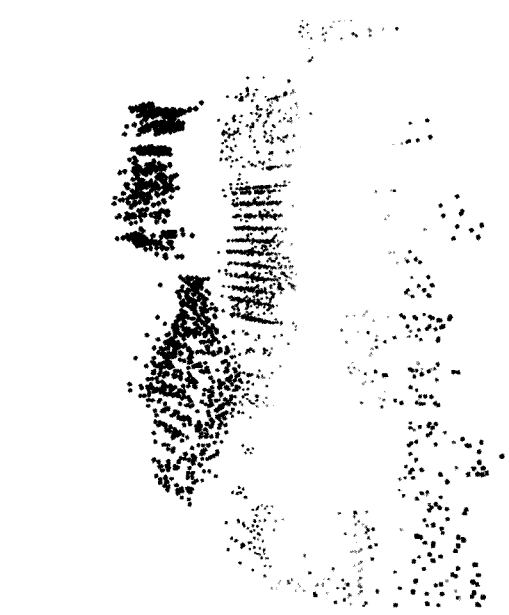
Figure 4:
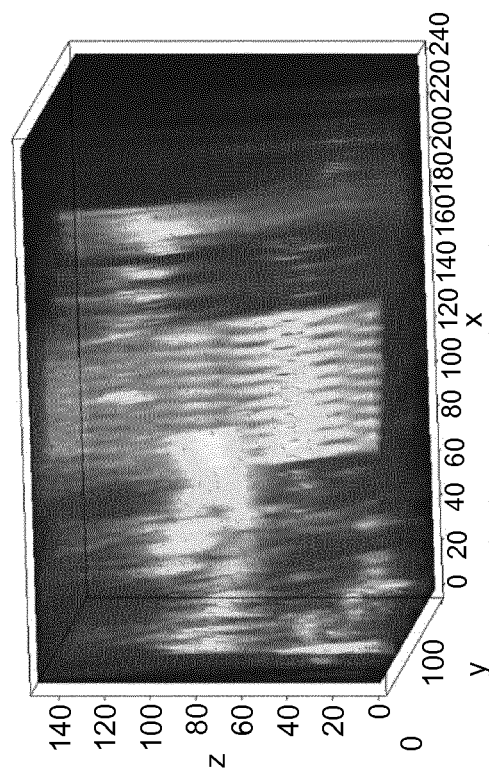
Figure 4:
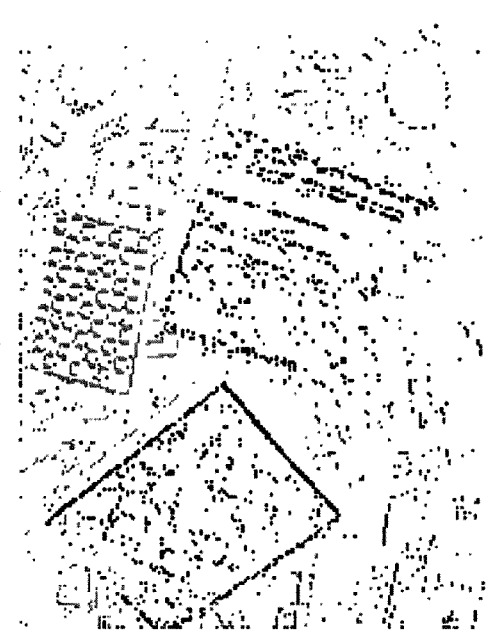

Then, particularly, the most confident pixels in the depth map are selected by thresholding the confidence map, yielding a semi-dense depth map (FIG. 4).

Particularly Adaptive Gaussian Thresholding may be used, wherein here a pixel (x,y) is selected if $c(x,y) > T(x,y)$, with $T(x,y) = c(x,y) * G_o(x,y) - C$.

Particularly, a 5×5 neighborhood in G, and C=−6 is used. This adaptive approach yields better results than global thresholding [3]. Further, a summary of the above-discussed elements of the DSI approach that are particularly used in the present invention is given in FIG. 4.

Thus, the structure of a scene corresponding to a subset of the events around a reference view can be reconstructed. As already pointed out above, motivated by a scalable design, this operation is preferably carried out on multiple subsets of the event stream, thus recovering semi-dense depth maps of the scene at multiple key reference views.

Particularly, a new key reference viewpoint is selected as soon as the distance to the previous key reference viewpoint exceeds a certain percentage of the mean scene depth, and use the subset of events until the next key reference viewpoint to estimate the corresponding semi-dense depth map of the scene.

The semi-dense depth maps are optionally smoothed using a 2D median filter acting on the confident pixel locations then converted to point clouds, cleaned from isolated points (those whose number of neighbors within a given radius is less than a threshold) and merged into a global point cloud using the known positions of the virtual cameras.

Other depth map fusion strategies may also be used/implemented.

The approach according to the present invention shows compelling large-scale 3D reconstruction results even without the need for complex fusion methods or regularization.

EXAMPLES

In the following, the performance of the event-based Space Sweep Method according to the present invention described above is evaluated, on both synthetic and real datasets.

Three synthetic datasets have been generated with ground truth information by means of an event camera simulator. The spatial resolution has been set to 240×180 pixels, corresponding to the resolution of commercial event sensors. The datasets also contain intensity images along the event camera viewpoints.

However, these are not used in the EMVS algorithm according to the invention; they are solely shown to aid the visualization of the semi-dense depth maps obtained with the method according to the invention. The datasets exhibit various depth profiles and motions: Dunes consists of a smooth surface (two dunes) and a translating and rotating camera in two degrees of freedom (DOF), 3 planes shows three planes at different depths (i.e., discontinuous depth profile with occlusions) and a linear camera motion; finally, 3 walls shows a room with three walls (i.e., a smooth depth profile with sharp transitions) and a general, 6-DOF camera motion.

The EMVS algorithm according to the invention was executed on each dataset.

First, the sensitivity of the method according to the invention was evaluated with respect to the number of depth planes $N_z$ used to sample the DSI.

Figure 5:
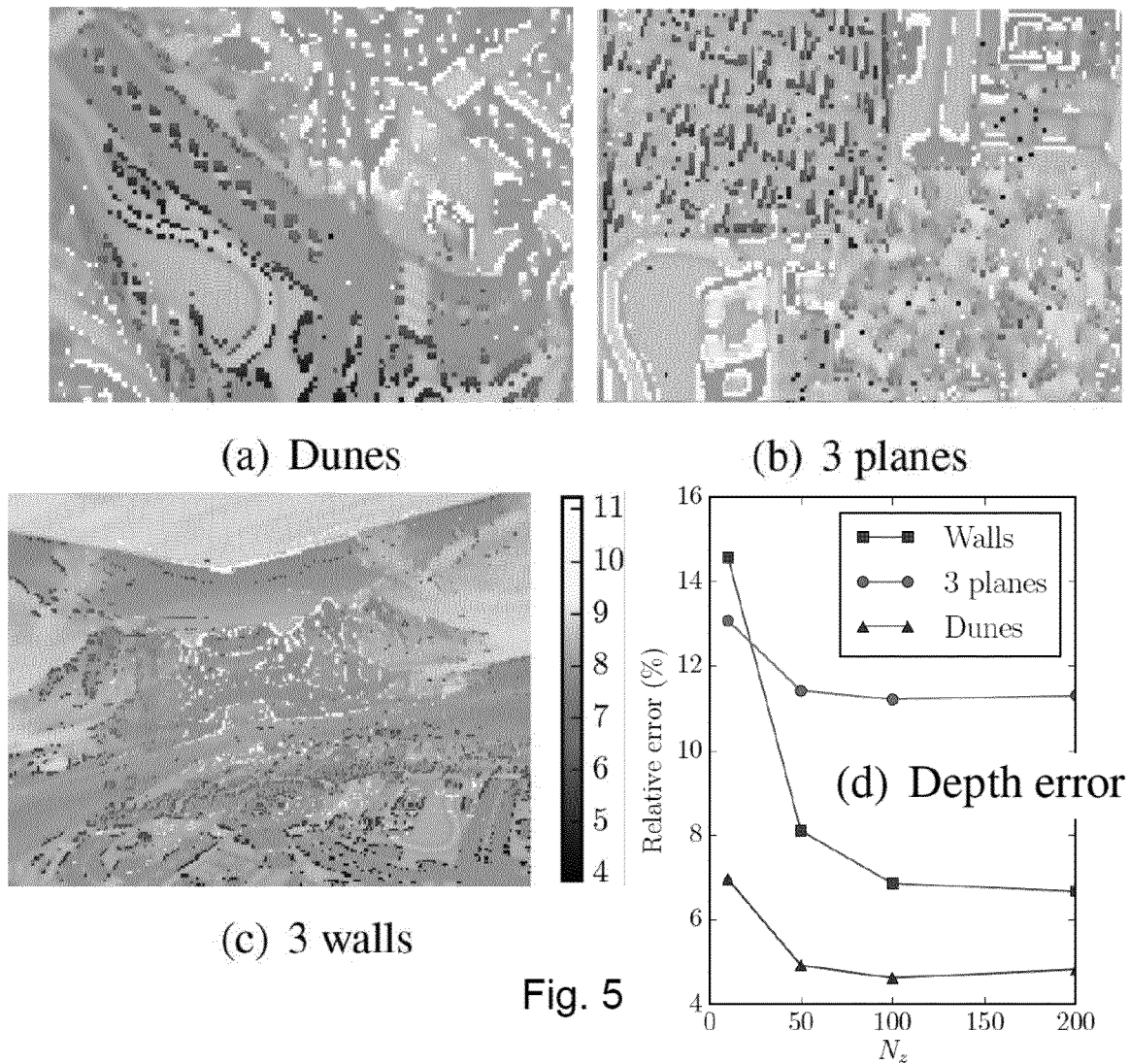

Particularly, depth instead of inverse depth was used in the DSI since it provided better results in scenes with finite depth variations. FIG. 5(d) shows, as a function of $N_z$, the relative depth error, which is defined as the mean depth error (between the estimated depth map and the ground truth) divided by the depth range of the scene.

As expected, the error decreases with $N_z$, but it stagnates for moderate values of $N_z$. Hence, from then on, a fixed number of $N_z = 100$ depth planes has been used.

Table 1 reports the mean depth error of the estimated 3D points, as well as the relative depth error for all three datasets. Depth errors are small, in the order of 10% or less, showing the good performance of the EMVS algorithm according to the invention and its ability to handle occlusions and a variety of surfaces and camera motions.

TABLE 1

Depth estimation accuracy in the synthetic datasets ($N_z = 100$)

|  | Dunes | 3 planes | 3 walls |
| --- | --- | --- | --- |
| Depth range | 3.00 m | 1.30 m | 7.60 m |
| Mean error | 0.14 m | 0.15 m | 0.52 m |
| Relative error | 4.63% | 11.31% | 6.86% |

Furthermore, the performance of the EMVS algorithm according to the invention on datasets from a DAVIS sensor [1] has also been evaluated. The DAVIS outputs, in addition to the event stream, intensity frames as those of a standard camera, at low frame rate (24 Hz). However, here, the EMVS algorithm according to the invention does not use the frames; they are displayed here only to illustrate the semi-dense results of the method.

Two methods have been considered to provide the EMVS algorithm according to the invention with camera pose information: a motorized linear slider or a visual odometry algorithm on the DAVIS frames. Particularly, the motorized slider has been used to analyze the performance in controlled experiments (since it guarantees very accurate pose information) and a visual odometry algorithm (SVO [4]) to show the applicability of our method in hand-held (i.e., unconstrained) 6-DOF motions.

Particularly, it was found out that the EMVS algorithm according to the invention is able to recover accurate semi-dense structure in two challenging scenarios, namely (i) high-dynamic-range (HDR) illumination conditions and (ii) high-speed motion. For this, the DAVIS was placed on the motorized linear slider, facing a textured wall at a known constant depth from the sensor. In both experiments, the accuracy of the semi-dense maps against ground truth was measured, wherein a compelling depth estimation accuracy was found, namely in the order of 5% of relative error, which is very high, especially considering the low resolution of the sensor (only 240×180 pixels).

Furthermore, two datasets have been recorded under the same acquisition conditions except for illumination (FIG. 6): at first with constant illumination throughout the scene and, second, with a powerful lamp illuminating only half of the scene. In the latter case, a standard camera cannot cope with the wide intensity variation in the middle of the scene since some areas of the images are under-exposed while others are over-exposed. Here, a High Dynamic Range (HDR) experiment with two different wall distances (close and far) was performed.

Figure 6:
Figure 6:

The results of the EMVS algorithm according to the invention are given in FIG. 6 and Table 2.

TABLE 2

Depth estimation accuracy in the HDR experiment

| | Close (distance: 23.1 cm) | | Far (distance: 58.5 cm) | |
|---|---|---|---|---|
| Illumination | Mean error | Relative error | Mean error | Relative error |
| constant | 1.22 cm | 5.29% | 2.01 cm | 4.33% |
| HDR | 1.21 cm | 5.25% | 1.87 cm | 3.44% |

It has been observed that the quality of the reconstruction is unaffected by the illumination conditions. In both cases, the EMVS method according to the invention has a very high accuracy (mean relative error≅5%), and also in spite of the low spatial resolution of the event camera/sensor or the lack of regularization.

Moreover, it is to be noted that the accuracy is not affected by the illumination conditions. Thus, the high dynamic range capabilities of the sensor allow successful HDR depth estimation.

Figure 7:
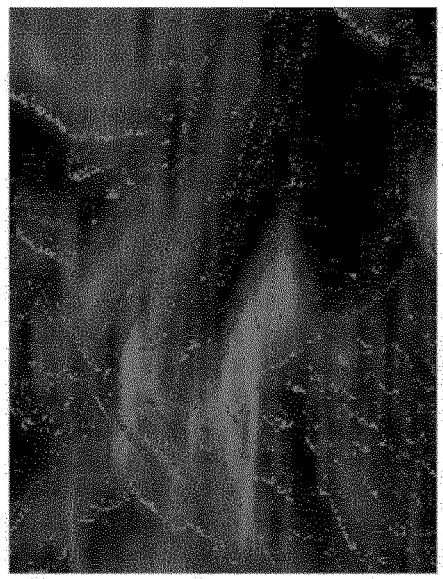
FIG. 7 shows high-speed experiments, namely the frame and the events from the DAVIS (event camera) at 376 pixels/s. The frame suffers from motion blur, while the events do not, thus preserving the visual content.
Figure 7:
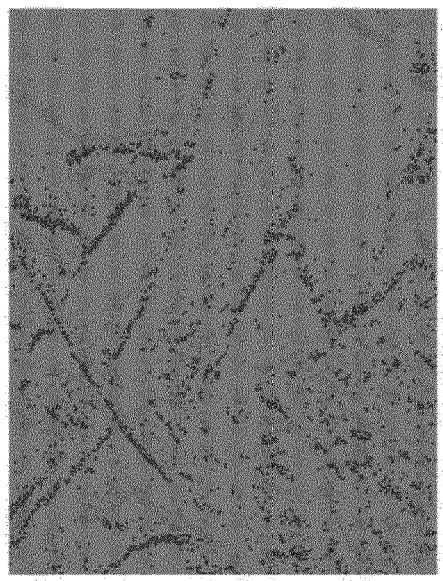
Figure 7:

Furthermore, to show that the high-speed capabilities of the event sensor can be exploited for 3D reconstruction, a dataset with the DAVIS at 40.5 cm from the wall and moving at 0.45 m/s has been recorded. This corresponds to a speed of 376 pixels/s in the image plane, which caused motion blur in the DAVIS frames (cf. FIG. 7).

The motion blur makes the visual information unintelligible. By contrast, the high temporal resolution of the event stream still accurately captures the edge information of the scene. The EMVS method according to the invention produced a 3D reconstruction with a mean depth error of 1.26 cm and a relative error of 4.84%. The accuracy is consistent with that of previous experiments (≅5%), thus supporting the remarkable performance of the method according to the invention and its capability to exploit the high-speed characteristics of the event camera/sensor.

Figure 8:
FIG. 8 shows the desk dataset: scene with objects and occlusions.
Figure 8:
Figure 8:

FIGS. 8 and 9 show some results obtained by the EMVS method according to the invention on non-flat scenes. Both, the semi-dense point cloud and its projection on a frame (for better understanding) are shown.

In FIG. 8, the DAVIS (event camera) moves in front of a scene containing various objects with different shapes and at different depths. In spite of the large occlusions of the distant objects, generated by the foreground objects, the EMVS algorithm according to the invention is able to recover the structure of the scene reliably.

Finally, FIG. 9 shows the result of the EMVS algorithm according to the invention on a larger scale dataset. The sensor was hand-held moved in a big room featuring various textured boxes.

Multiple local point clouds are estimated along the trajectory, which are then merged into a global, large-scale 3D reconstruction.

Furthermore, yet another aspect of the present invention relates to a method for localizing an event camera.

Here, a corresponding tracking module relies on image-to-model alignment, which is also used in frame-based, direct VO pipelines [13], [14]. In these approaches, a 3D rigid body warp is used to register each incoming intensity image to a keyframe. They minimize the photometric error on a set of selected pixels whose 3D correspondences in the scene have already been established.

Particularly, the same global image alignment strategy is followed, but, since event cameras naturally respond to edges in the scene, the photometric error is replaced by a geometric alignment error between two edge images (see Eq. (1)). The two images involved in the registration process are (see FIG. 10): an event image I, obtained by aggregating a small number of events into an edge map, and a template M, which consists of the projected semi-dense 3D map of the scene according to a known pose of the event camera 1. In this regard, FIG. 10 (a) shows a 3D scene and poses involved in the registration process, wherein FIG. 10 (b) shows the projected semi-dense map M, and FIG. 10 (c) shows the event image I.

Particularly, registration is done using the inverse compositional Lucas-Kanade (LK) method [15], [16], by iteratively computing the incremental pose ΔT that minimizes $$\Sigma_u (M(W(u;\Delta T)) - I(W(u;T)))_2, \quad (1)$$

and then updating the warp W, which leads to the following update of the rigid-body transformation T from the frame of M to the frame of I:

$$T \leftarrow T \cdot (\Delta T)^{-1}. \quad (2)$$

In the inverse approach (Eq. (1)), the projected map M is warped until it is aligned with the warped event image given by the current estimate of the registration transformation T. The 3D rigid-body warp W is defined by $$W(u;T) := \pi(T \cdot \pi^{-1}(u, d_u)), \quad (3)$$

where u is a point in the image plane of M, T is a rigid-body transformation, $\pi$ and $\pi^{-1}$ denote the camera projection and inverse projection, respectively, and $d_u$ is the known depth of the 3D point projecting on pixel u. Hence, the sum in Eq. (1) is over all candidate pixels u in the domain of M for which there is an associated depth estimate $d_u$. The 3D rigid-body warp is defined so that W(u; Id)=u is the identity, as required in [15]. Particularly, rigid-body transformations are parametrized using twist coordinates [17]: $\xi \in \mathbb{R}^6$, with $T=\exp(\hat{\xi}) \in SE(3)$ and Lie algebra element $\hat{\xi} \in \mathfrak{se}(3)$.

Since both I and M carry information about edges, the objective function Eq. (1) can be interpreted as a measure of the registration error between two edge maps: the measured one using the events and the predicted one from the projection of the 3D edge map. Due to the principle of operation of the event camera 1, the event image I captures all edges except those parallel to the apparent motion.

The inverse compositional LK method has the advantage of low computational complexity with respect to other LK formulations [15]: the derivatives that depend on M can be pre-computed since M remains constant during the iteration.

Additionally, these computations can be re-used for aligning multiple event images I with respect to the same M.

For efficiency, in an example, analytical derivatives of the error function Eq. (1) have been used, which involve, by the chain rule, computing the gradient ∇IM and the derivative of the warping function with respect to the exponential coordinates of the unknown incremental pose ΔT. Using calibrated coordinates and assuming that lens distortion has been removed, $x=(u,v)^T \equiv K^{-1}u$, the latter derivative is given by the interaction matrix [18]

$$W' = \begin{pmatrix} -1/d_u & 0 & u/d_u & uv & -(1+u^2) & v \\ 0 & -1/d_u & v/d_u & 1+v^2 & -uv & -u \end{pmatrix}. \quad (4)$$

Finally, the poses T obtained upon convergence of the LK method Eq. (2) are filtered using an average filter to get a smoother trajectory of the event camera.

REFERENCES

[1] C. Brandli, R. Berner, M. Yang, S.-C. Liu, and T. Delbruck. A 240×180 130 dB 3 us latency global shutter spatiotemporal vision sensor. IEEE J. of Solid-State Circuits, 49 (10):2333-2341, 2014.

[2] L. A. Camunas-Mesa, T. Serrano-Gotarredona, S.-H. Ieng, R. Benosman, and B. Linares-Barranco. On the use of Orientation Filters for 3D Reconstruction in Event-Driven Stereo Vision. Front. Neurosci., 8(48), 2014.

[3] R. T. Collins. A space-sweep approach to true multi-image matching. In IEEE Int. Conf. Computer Vision and Pattern Recognition (CVPR), pages 358-363, June 1996.

[4] C. Forster, M. Pizzoli, and D. Scaramuzza. SVO: Fast semi-direct monocular visual odometry. In IEEE Int. Conf. on Robotics and Automation (ICRA), pages 15-22, 2014.

[5] J. Kogler, M. Humenberger, and C. Sulzbachner. Event-Based Stereo Matching Approaches for Frameless Address Event Stereo Data. In Advances in Visual Computing, volume 6938 of Lecture Notes in Computer Science, pages 674-685. Springer, 2011.

[6] J. Kogler, C. Sulzbachner, M. Humenberger, and F. Eibensteiner. Address-Event Based Stereo Vision with Bio-Inspired Silicon Retina Imagers. In Advances in Theory and Applications of Stereo Vision, pages 165-188. InTech, 2011.

[7] J. Lee, T. Delbruck, P. Park, M. Pfeiffer, C. Shin, H. Ryu, and B. C. Kang. Gesture based remote control using stereo pair of dynamic vision sensors. In Int. Conf. on Circuits and Systems (ISCAS), 2012.

[8] P. Rogister, R. Benosman, S.-H. Ieng, P. Lichtsteiner, and T. Delbruck. Asynchronous Event-Based Binocular Stereo Matching. IEEE Trans. Neural Networks and Learning Systems, 23(2):347-353, February 2012.

[9] S. Schraml, A. N. Belbachir, N. Milosevic, and P. Schön. Dynamic stereo vision system for real-time tracking. In Int. Conf. on Circuits and Systems (ISCAS), 2010.

[10] S. M. Seitz, B. Curless, J. Diebel, D. Scharstein, and R. Szeliski. A comparison and evaluation of multi-view stereo reconstruction algorithms. In IEEE Int. Conf. Computer Vision and Pattern Recognition (CVPR), 2006.

[11] R. Szeliski. Computer Vision: Algorithms and Applications. Texts in Computer Science. Springer, 2010.

[12] R. Szeliski and P. Golland. Stereo matching with transparency and matting. Int. J. Comput. Vis., 32(1):45-61, 1999.

[13] C. Forster, M. Pizzoli, and D. Scaramuzza, "SVO: Fast semi-direct monocular visual odometry," in IEEE Int. Conf. on Robotics and Automation (ICRA), 2014, pp. 15-22.

[14] J. Engel, J. Schöps, and D. Cremers, "LSD-SLAM: Large-scale direct monocular SLAM," in Eur. Conf. on Computer Vision (ECCV), 2014.

[15] S. Baker and I. Matthews, "Lucas-Kanade 20 years on: A unifying framework," Int. J. Comput. Vis., vol. 56, no. 3, pp. 221-255, 2004.

[16] A. Crivellaro, P. Fua, and V. Lepetit, "Dense Methods for Image Alignment with an Application to 3D Tracking," EPFL, Tech. Rep. 197866, 2014.

[17] Y. Ma, S. Soatto, J. Kosecka, and S. S. Sastry, An Invitation to 3-D Vision: From Images to Geometric Models. Springer Verlag, 2004.

[18] P. Corke, Robotics, Vision and Control: Fundamental Algorithms in MATLAB, ser. Springer Tracts in Advanced Robotics. Springer, 2011.

The invention claimed is:

1. A method for 3D reconstruction of a scene, wherein an event camera (1) is moved on a trajectory (T) along the scene, wherein the event camera (1) comprises a plurality of pixels that are configured to only output events ($e_k$) in presence of brightness changes in the scene at the time ($t_k$) they occur, wherein each event comprises the time ($t_k$) at which it occurred, an address ($x_k$, $y_k$) of the respective pixel that detected the brightness change, as well as a polarity value ($p_k$) indicating the sign of the brightness change, wherein a plurality of successive events generated by the event camera (1) along said trajectory (T) are back-projected according to the viewpoint (P) of the event camera (1) as viewing rays (R) through a discretized volume (DSI) at a reference viewpoint (RV) of a virtual event camera associated to said plurality of events, wherein said discretized volume (DSI) comprises voxels (V'), and wherein a score function $f(X)$ associated to the discretized volume (DSI) is determined, which score function $f(X)$ gives the number of back-projected viewing rays (R) that pass through the respective voxel (V') with center X, and wherein said score function $f(X)$ is used to determine whether or not a 3D point of the 3D reconstruction of the scene is present in the respective voxel (V').

2. The method of claim 1, characterized in that said discretized volume (DSI) has a size w×h×$N_z$, wherein w and h are the number of pixels of the event camera in x and y direction and wherein $N_z$ is a number of depth planes $\{Z_i\}_i=1^{N_z}$ and wherein particularly the discretized volume (DSI) is adapted to the field of view and perspective projection of the event camera (1) at said reference viewpoint (RV).

3. The method of claim 1, characterized in that it is determined that a 3D point of the scene is present in a voxel (V') when said score function $f(X)$ assumes a local maximum for this voxel (V').

4. The method of claim 3, characterized in that the local maxima of the score function $f(X)$ are detected by generating a dense depth map $Z^*(x,y)$ and an associated confidence map $c(x,y)$ at said reference viewpoint (RV), wherein $Z^*(x,y)$ stores the location of the maximum score along the row of voxels corresponding to pixel (x,y), and wherein $c(x,y)$ stores the value of said maximum score, $c(x,y):=f(X(x),Y(y),Z^*(x,y))$, and wherein a semi-dense depth map is created from the map $Z^*$ by selecting a subset of pixels using said confidence map $c(x,y)$, and wherein adaptive Gaussian thresholding is applied to said confidence map $c(x,y)$ so as to generate a binary confidence mask that selects said subset of pixel locations in the map Z* in order to produce a semi-dense depth map, wherein a pixel (x,y) is selected if c(x,y)>T(x,y), with T(x,y)=c(x,y)*G(x,y)−C, where * denotes the 2D convolution, G is a Gaussian kernel, and C a constant offset.

5. The method according to claim 1, characterized in that said plurality of successive events generated by the event camera (1) along said trajectory (T) forms a subset of events of a stream of events generated by the event camera (1) along said trajectory (T), wherein said stream is divided into a plurality of subsequent subsets of events, wherein each subset contains a plurality of successive events generated by the event camera (1), wherein the successive events of each subset are back-projected according to the viewpoint (P) of the event camera (1) as viewing rays (R) through a discretized volume (DSI) at a reference viewpoint (RV) of a virtual event camera associated to the respective subset, wherein the respective discretized volume (DSI) comprises voxels (V'), and wherein a score function $f(X)$ associated to the respective discretized volume (DSI) is determined, which score function $f(X)$ is the number of back-projected viewing rays (R) of the respective subset that pass through the respective voxel (V') with center X of the respective discretized volume (DSI), and wherein the respective score function $f(X)$ is used to determine whether or not a 3D point of the 3D reconstruction of the scene is present in the respective voxel (V') of the respective discretized volume (DSI) associated to the respective subset.

6. The method of claim 5, characterized in that the local maxima of the respective score function $f(X)$ are detected by generating a dense depth map Z*(x,y) and an associated confidence map c(x,y) for each reference viewpoint (RV), wherein Z*(x,y) stores the location of the maximum score along the row of voxels (V') corresponding to each pixel (x,y), with viewing ray (R'), of the respective reference viewpoint (RV), and wherein c(x,y) stores the value of said maximum score, c(x,y):=f(X(x),Y(y),Z*(x,y)), and wherein a respective semi-dense depth map for the respective reference viewpoint is created from the respective map Z* by selecting a subset of pixels using the respective confidence map c(x,y), and wherein adaptive Gaussian thresholding is applied to the respective confidence map c(x,y) so as to generate a respective binary confidence mask that selects said subset of pixel locations in the respective map Z* in order to produce a respective semi-dense depth map, wherein a pixel (x,y) is selected if c(x,y)>T(x,y), with T(x,y)=c(x,y)*G(x,y)−C, where * denotes the 2D convolution, G is a Gaussian kernel, and C a constant offset.

7. The method according to claim 6, characterized in that the depth maps are converted to point clouds, wherein the respective point cloud is particularly cleaned from those isolated points whose number of neighbors within a given radius is less than a threshold, and wherein said point clouds are merged into a global point cloud using the known positions of the virtual event cameras at the respective reference viewpoint, wherein said global point cloud comprises the 3D points of the 3D reconstruction of the scene.

8. The method according to claim 1, characterized in that the event camera (1) is moved manually along said trajectory (T).

9. The method according to claim 1, characterized in that the event camera (1) is moved along said trajectory (T) by means of a movement generating means.

10. The method according to claim 9, characterized in that said movement generating means is formed by one of: a motor, a motor vehicle, a train, an aircraft, a robot, a robotic arm, a bicycle.

11. The method according to claim 1, characterized in that the event camera (1) is moved along said trajectory (T) with a velocity in the range from 0 km/h to 500 km/h, particularly 1 km/h to 500 km/h, particularly 100 km/h to 500 km/h, particularly 150 km/h to 500 km/h, particularly 200 km/h to 500 km/h, particularly 250 km/h to 500 km/h, particularly 300 km/h to 500 km/h, particularly 350 km/h to 500 km/h, particularly 400 km/h to 500 km/h.

12. A computer program product for 3D reconstruction of a scene, the computer program product comprising a non-transitory computer-readable storage medium having program code embodied therewith, the program code executable by at least one hardware processor to:
back-project a plurality of events an event camera (1) according to the viewpoint (P) of the event camera (1) as viewing rays (R) through a discretized volume (DSI) at a reference viewpoint (RV) of a virtual event camera associated to said plurality of events, wherein said discretized volume (DSI) comprises voxels (V'),
determine a score function $f(X)$ associated to the discretized volume (DSI), which score function $f(X)$ gives the number of back-projected viewing rays (R) that pass through the respective voxel (V') with center X, and
use said score function $f(X)$ to determine whether or not a 3D point of the 3D reconstruction of the scene is present in the respective voxel (V').

13. Device comprising an event camera (1) and an analyzing means, wherein said event camera (1) and said analyzing means are configured to conduct the method according to claim 1 when the event camera (1) is moved on a trajectory (T) along the scene.

* * * * *